(12) United States Patent
Annetts (10) Patent No.: US 9,321,385 B2
(45) Date of Patent: Apr. 26, 2016

(54) HUNGRY BOARD ASSEMBLY (71) Applicant: FSP Mining Components Pty Ltd, Yatala, Queensland (AU)

(72) Inventor: Richard Annetts, Townsville (AU)

(73) Assignee: FSP MINING COMPONENTS PTY LTD, Yatala, Queensland (AU)

( * ) Notice: Subject to any disclaimer, the term of this patent is extended or adjusted under 35 U.S.C. 154(b) by 0 days.

(21) Appl. No.: 13/962,732

(22) Filed: Aug. 8, 2013

(65) Prior Publication Data
US 2014/0042764 A1 Feb. 13, 2014

Related U.S. Application Data (63) Continuation-in-part of application No. PCT/AU2012/000132, filed on Feb. 11, 2012.

(30) Foreign Application Priority Data

Feb. 10, 2011 (AU) .................................. 2011900430
Mar. 6, 2011 (AU) .................................. 2011900792

(51) Int. Cl.
*B62D 27/00* (2006.01)
*B60P 1/28* (2006.01)

(52) U.S. Cl.
CPC ............ *B60P 1/286* (2013.01); *Y10T 29/49947* (2015.01)

(58) Field of Classification Search
CPC ............... A61B 2017/0409; A61B 2017/0417; A61B 2017/00004; A61B 2017/003; H04L 47/39; H04L 3924/0002; G06F 3/0601; G06F 2003/0694; G11C 11/22; A01N 65/00
USPC ............................ 296/36; 36/50.1, 54; 70/164
See application file for complete search history.

(56) References Cited

U.S. PATENT DOCUMENTS

| | | | | | |
|---|---|---|---|---|---|
| 3,938,238 | A | * | 2/1976 | Kershaw .................. | B60P 1/286 29/464 |
| 4,474,404 | A | * | 10/1984 | Hagenbuch .............. | B60P 1/286 266/165 |
| 4,614,477 | A | * | 9/1986 | Hagenbuch ............. | B65D 90/48 116/227 |
| 4,621,858 | A | * | 11/1986 | Hagenbuch ............... | B60P 1/26 296/56 |
| 4,678,235 | A | * | 7/1987 | Hagenbuch .............. | B60P 1/267 296/183.2 |
| 4,826,233 | A | * | 5/1989 | Hagenbuch .............. | B60P 1/286 266/165 |

(Continued)

FOREIGN PATENT DOCUMENTS

EP 1 473 189 11/2004

OTHER PUBLICATIONS

International Search Report, PCT/AU2012/000132, completion date: Apr. 4, 2012; 5 pages.

*Primary Examiner* — Kiran B Patel (57) ABSTRACT

Hungry boards, or spill boards, for mounting about a tip truck load carrying body are formed with a pair of spaced apart vertical bores corresponding to and depending downward from the access cutouts. Vertical bores formed through the hungry board receive the threaded end of an anchor bolt which is welded to lip of the body. The anchor bolt comprises part of a resilient fastening system for attachment of the hungry board the anchor bolt is formed with a flat foot from which a shank extends. The shank terminates upwardly in a threaded upper end. A compression spring is located about the shank and arranged to absorb impact forces directed at the hungry board during use. The hungry boards are made of a light weight resilient material such as a tough synthetic rubber.

11 Claims, 13 Drawing Sheets

(56) References Cited

U.S. PATENT DOCUMENTS

| | | | | |
|---|---|---|---|---|
| 5,174,632 A * | 12/1992 | Hagenbuch | B60P 1/267 | 296/183.2 |
| 5,228,750 A * | 7/1993 | Hagenbuch | B60P 1/16 | 105/423 |
| 5,405,210 A * | 4/1995 | Tsui | B21K 1/72 | 403/119 |
| 5,474,363 A * | 12/1995 | Hagenbuch | B60P 1/16 | 298/23 DF |
| 5,887,914 A * | 3/1999 | Hagenbuch | B60P 1/16 | 296/183.2 |
| 6,022,068 A * | 2/2000 | D'Amico | B60P 1/286 | 296/183.2 |
| 6,068,310 A * | 5/2000 | Fuller | B66C 1/66 | 294/215 |
| 6,481,785 B1 * | 11/2002 | Coleman | B60P 1/286 | 296/183.2 |
| 6,491,349 B2 * | 12/2002 | McCafferty | B60P 1/26 | 298/23 D |
| 6,749,237 B1 * | 6/2004 | Ma | B66C 1/66 | 294/180 |
| 6,854,808 B2 * | 2/2005 | Kostecki | B60P 1/286 | 296/183.2 |
| 6,935,678 B1 * | 8/2005 | Laban | B60P 1/286 | 296/183.1 |
| 7,032,957 B2 * | 4/2006 | Miller | B60P 1/286 | 296/183.1 |
| 7,100,256 B2 * | 9/2006 | D'Amico | B60P 1/286 | 29/401.1 |
| 7,114,872 B2 * | 10/2006 | Alba | F16D 1/12 | 294/215 |
| 7,207,621 B2 * | 4/2007 | D'Amico | B62D 33/02 | 296/183.1 |
| 7,407,217 B2 | 8/2008 | Compaan | | |
| 7,434,868 B2 * | 10/2008 | D'Amico | B60P 1/286 | 296/183.1 |
| 8,201,867 B2 * | 6/2012 | Thomeczek | B66C 1/66 | 294/215 |
| 8,596,701 B2 * | 12/2013 | Alba | B66C 1/66 | 294/215 |
| 8,622,676 B2 * | 1/2014 | Chen | F16B 35/06 | 411/371.2 |
| 8,651,580 B2 * | 2/2014 | Hagenbuch | B60P 1/286 | 298/1 B |
| 8,708,391 B2 * | 4/2014 | Dunn | B60P 1/286 | 296/39.2 |
| 8,770,651 B2 * | 7/2014 | Hagenbuch | B62D 25/2045 | 296/184.1 |
| 8,882,179 B2 * | 11/2014 | Kitaguchi | B60P 1/286 | 296/183.2 |
| 2002/0034612 A1 | 3/2002 | Knutson | | |
| 2003/0223849 A1 * | 12/2003 | Hagenbuch | B60P 1/006 | 414/511 |
| 2004/0036245 A1 * | 2/2004 | Mollhagen | B60K 17/046 | 280/124.128 |
| 2005/0093338 A1 * | 5/2005 | Medel | B60P 1/283 | 296/183.1 |
| 2007/0069569 A1 * | 3/2007 | D'Amico | B62D 33/02 | 298/7 |
| 2008/0067856 A1 * | 3/2008 | Hagenbuch | B60P 1/286 | 298/17 R |

* cited by examiner

HUNGRY BOARD ASSEMBLY

CROSS REFERENCE TO RELATED APPLICATIONS

This application is a continuation-in-part of International application number PCT/AU2012/000132 filed Feb. 10, 2012 for An Improved Hungry Board Assembly, claiming priority from Australian application number 2011900430, filed Feb. 10, 2011, and Australian application number 2011900792, filed Mar. 6, 2011.

TECHNICAL FIELD

The present invention relates to hungry board assemblies for use with both on highway and off highway truck bodies in the mining and excavation industries.

BACKGROUND

The discussion of any prior art documents, techniques, methods or apparatus is not to be taken to constitute any admission or evidence that such prior art forms, or ever formed, part of the common general knowledge.

"Hungry boards", sometimes known as spill boards, are wings or extensions to the top edges of tip truck bodies for the transportation of loads such as coal and ore. The use of hungry boards allows the bodies to transport higher capacity loads as higher piles of load may be heaped in the body without the load falling over the body edge.

Traditionally, hungry boards are steel wings that are welded or otherwise permanently fitted to the body.

These traditional hungry board systems suffer from a number of disadvantages. They add additional weight to the tare weight of the truck so that there is less available payload and so a resulting loss of revenue.

The traditional hungry boards are made of steel and are welded to the truck body. They are susceptible to damage from rocks/material/or other excavator buckets making contact with them.

The steel splits open when damaged and fills up with dirt adding even more weight. The boards are dangerous if not repaired since steel can break off and cause injury to personnel and damage to tyres.

Furthermore, the boards are labour intensive to repair and can take several days to repair or replace.

Additional cost is incurred to hire welding machines and consumables for repairs. Damaged units need to go back to a workshop for repairs since they cannot be repaired effectively in the field. Additional cost of scaffolding or man lifts EWP are incurred to safely house maintenance personnel during repairs.

Other associated problems and additional costs are that cranes are required to lift the boards off and back on to the bodies. People need to work at heights for long periods of time. Personnel are exposed to heat from welding, grinding and cutting of materials. Personnel are exposed to noise when dogging into place to fit up and weld. Personnel have to fill out hot work permits. Personnel have to fill out working at height permits. It will be realized that repairs to the hungry boards may tie up multiple maintenance personnel for days. The repair process may also cause issues environmentally on site due to sand blasting and painting of units when replaced.

It is an object of the present invention to provide an improved hungry board system that addresses one or more of the above discussed problems of the prior art and/or which is at least a useful alternative to those hungry boards that have hitherto been known in the prior art.

SUMMARY OF THE INVENTION

According to a first aspect of the present invention there is provided a hungry board assembly including:
  a hungry board formed of a non-ferrous material;
  one or more resilient members;
  a fastening system for attaching the hungry board to a body by means of said resilient members.

Preferably the fastening system includes one or more anchor members for fastening to the body with each including an elongate shaft.

In a preferred embodiment the fastening system includes one or more anchor brackets formed into an underside of the hungry board and corresponding to the anchor members.

Preferably rotation plates are located beneath the anchor brackets.

The one or more. resilient members may comprise springs located about corresponding ones of the elongate shafts wherein the springs are captured between a feet of the anchor members and the rotation plate.

Preferably ends of the anchor members opposite the feet penetrate the rotation plate and the body anchor bracket and are retained at their outer end by respective fastening members.

The hungry boards may be formed with cutaways to allow access for a tool to the fastening members.

An elongate internal support plate may be located within the hungry board to distribute impact forces thereon across at least two of the resilient members.

The hungry board assembly may further include a plurality of rigid fastening assemblies for additional fastening of the hungry board to the body.

In one embodiment the rigid fastening assembly includes lugs that are received within complementary receptacles formed in the hungry board. Preferably the rigid fastening assembly includes pins, bolts or the like to fasten the lugs within the complementary receptacles.

In a first embodiment the hungry board is formed of an elastomeric material.

In a preferred embodiment the resilient members comprise springs. For example, cylindrical springs or double conical springs may be used.

Alternatively, the resilient members may comprise a' piece of elastomeric material and/or composite material, such as a tough synthetic rubber for example.

The fastening system includes a nuts, bolts and washers for retaining one end of the resilient member to the body and another end to the hungry board.

In a preferred embodiment, the hungry board is formed with a series of receptacles to receive corresponding ones of the one or more resilient members.

Preferably the resilient members and the receptacles are of complementary cylindrical shapes.

An infill may be provided between an end of the hungry board and an edge of the body to thereby present a continuous edge.

Preferably the height of the hungry board corresponds to the type of load for which the body is to be used.

According to a further aspect of the present invention there is provided an ore transportation vehicle having a body fitted with a hungry board assembly of the type described above.

According to another aspect of the present invention there is provided a method of attaching a hungry board to a truck body including the steps of:

locating a series of apertures along a lip of an edge of the body;

retaining resilient members in the series of apertures; and securing the hungry board to the resilient members.

According to another aspect of the present invention there is provided a method of attaching a hungry board to a truck body including the steps of:

fastening a series of anchor members along an edge of the body;

retaining resilient members about the anchor members; and securing the hungry board to the anchor members for the resilient members to absorb forces impacting the hungry board in use.

In a related aspect, the present invention provides a method of increasing the capacity of a dump truck or the like having a dump body comprising the steps of fixing mounts to side walls of the dump body and releasably fixing side wall extensions to the mounts wherein the side wall extensions is made from a plastics material such as polyethylene.

The side wall extensions may have sides which taper towards a typically rounded top, and may be hollow.

In one embodiment the mounts are welded to the top of the side walls of the dump body and include a projecting bolt shank to which the base of the side wall extensions may be releasably mounted. The base of the side wall extensions may define a recess or channel to receive the mounts.

The bolt may extend through a slot in the mount to allow the bolt to deflect from a vertical orientation parallel to the side walls of the dump body. The bolt may be biased by a spring or the like to cause it to return to a substantially vertical orientation after deflection.

Advantageously the present invention is able to increase the carrying capacity of a dump truck without significantly increasing the weight of the truck. The wall extensions are removable and flexible enough to withstand minor knocks.

BRIEF DESCRIPTION OF THE DRAWINGS

The Detailed Description is not to be regarded as limiting the scope of the preceding Summary of the Invention in any way. The Detailed Description will make reference to a number of drawings as follows.

Preferred features, embodiments and variations of the invention may be discerned from the following Detailed Description which provides sufficient information for those skilled in the art to perform the invention.

DETAILED DESCRIPTION OF PREFERRED EMBODIMENTS

Figure 1:
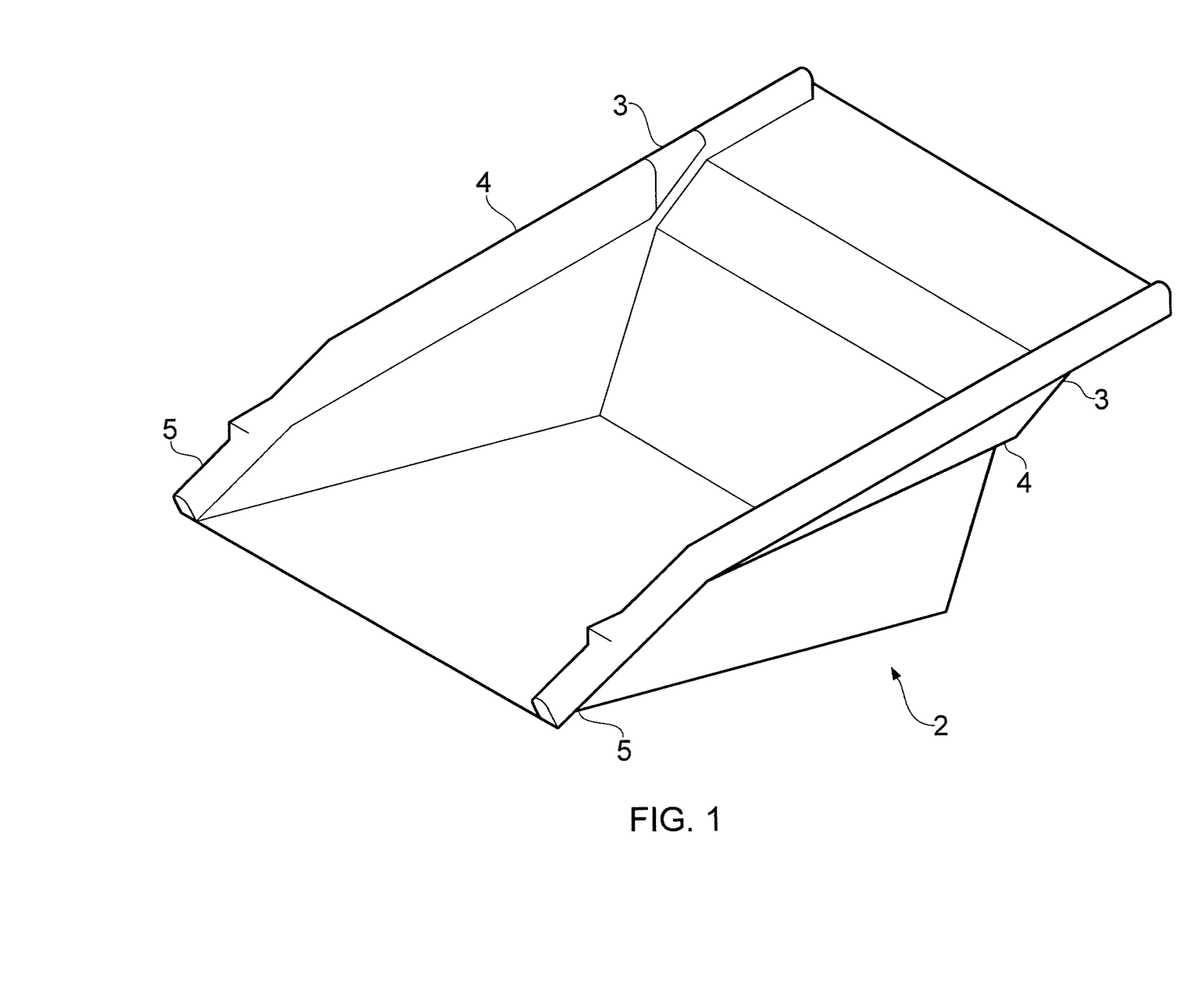
FIG. 1 is an isometric view of a body fitted with hungry boards according to a preferred embodiment of the present invention.
Figure 2:
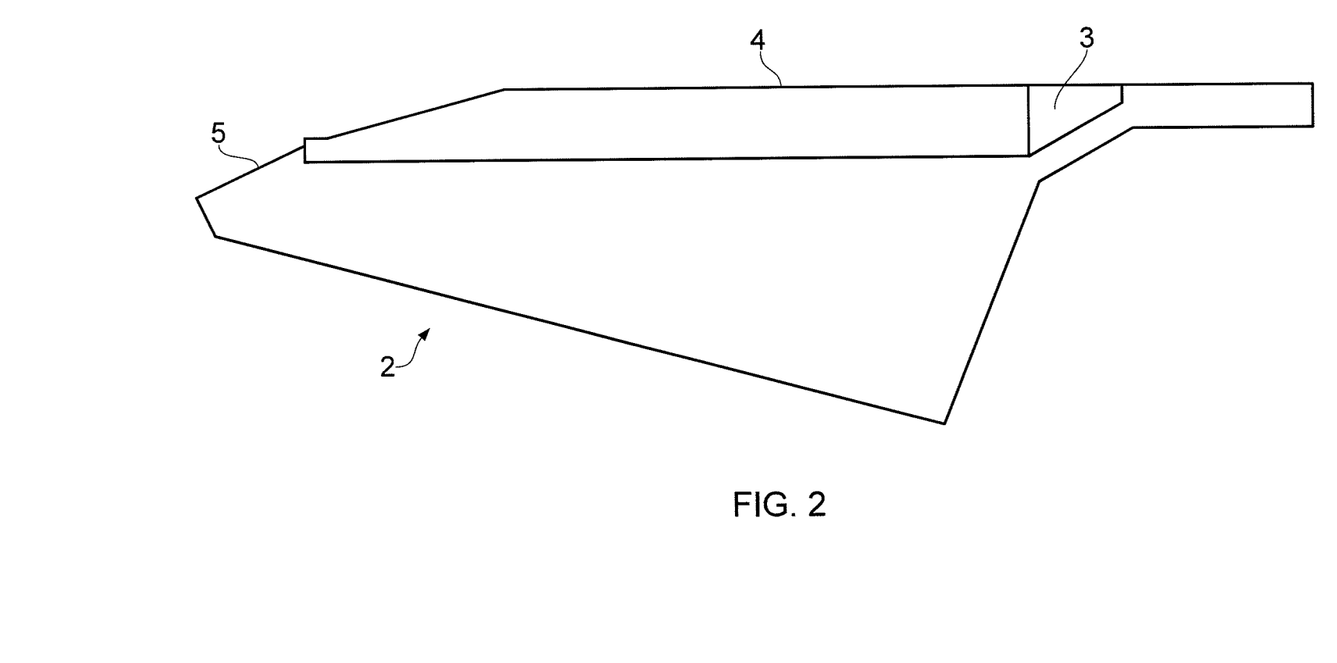
FIG. 2 is a plan view of the body of FIG. 1

Referring now to FIGS. 1 and 2, there is shown a body 2, such as a tip truck body for the transportation of a load. Hungry boards 4 have been fitted along the lips 5 of upper edges of the body 4 according to a preferred embodiment of the present invention.

A metal infill 3 is provided between the hungry board 4 and the forward, acutely angled, portion of the lip 5 in order to present a continuous upper edge.

The hungry board 4 is preferably formed of a non-ferrous material such as a resilient, elastomeric composite material which is able to absorb the shocks and stresses associated with the impact of load material as the body is loaded.

Figure 3:
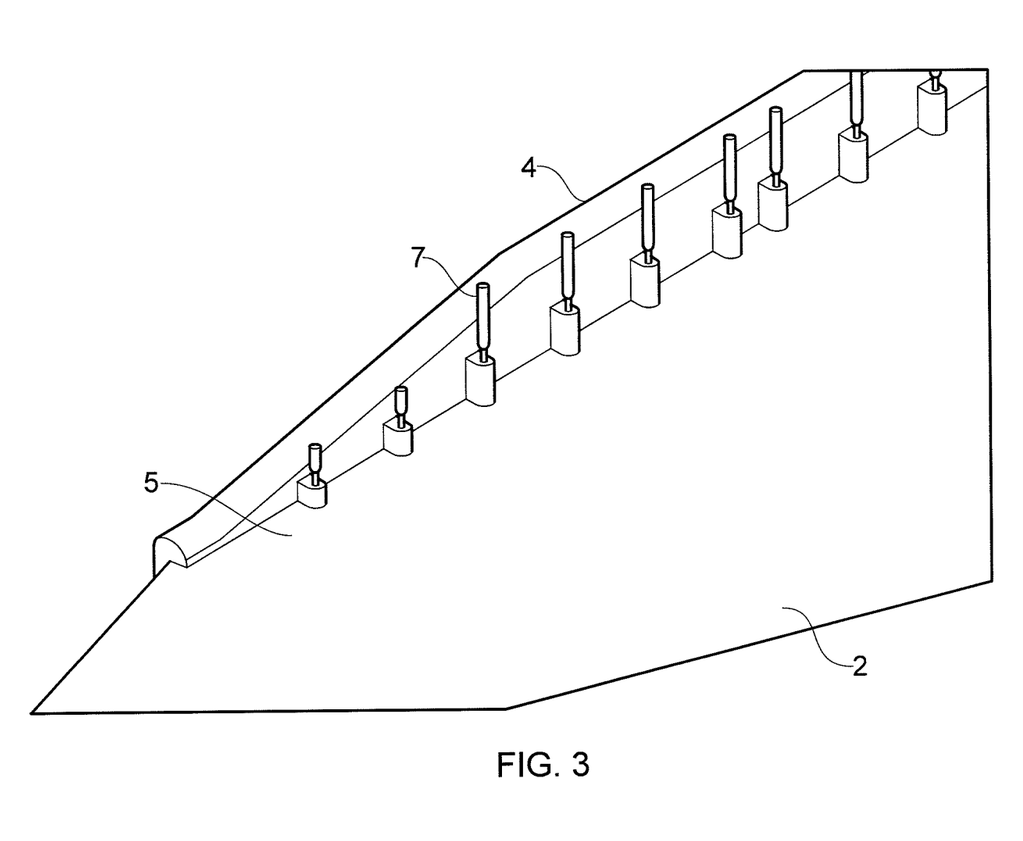
FIG. 3 is a detailed view with the hungry board cutaway to reveal a resilient fastening arrangement.

FIG. 3 is a detail view in which the hungry board-has been partially cut away to show a plurality of resilient members 6, which are received into corresponding receptacles 7 formed into the hungry board. The resilient members 6 may be cylindrical springs, double conical springs or solid pieces of elastomeric material. The resilient members 6 penetrate through holes 9 formed through the upper lip 5 of the edge of body 2.

Figure 4:
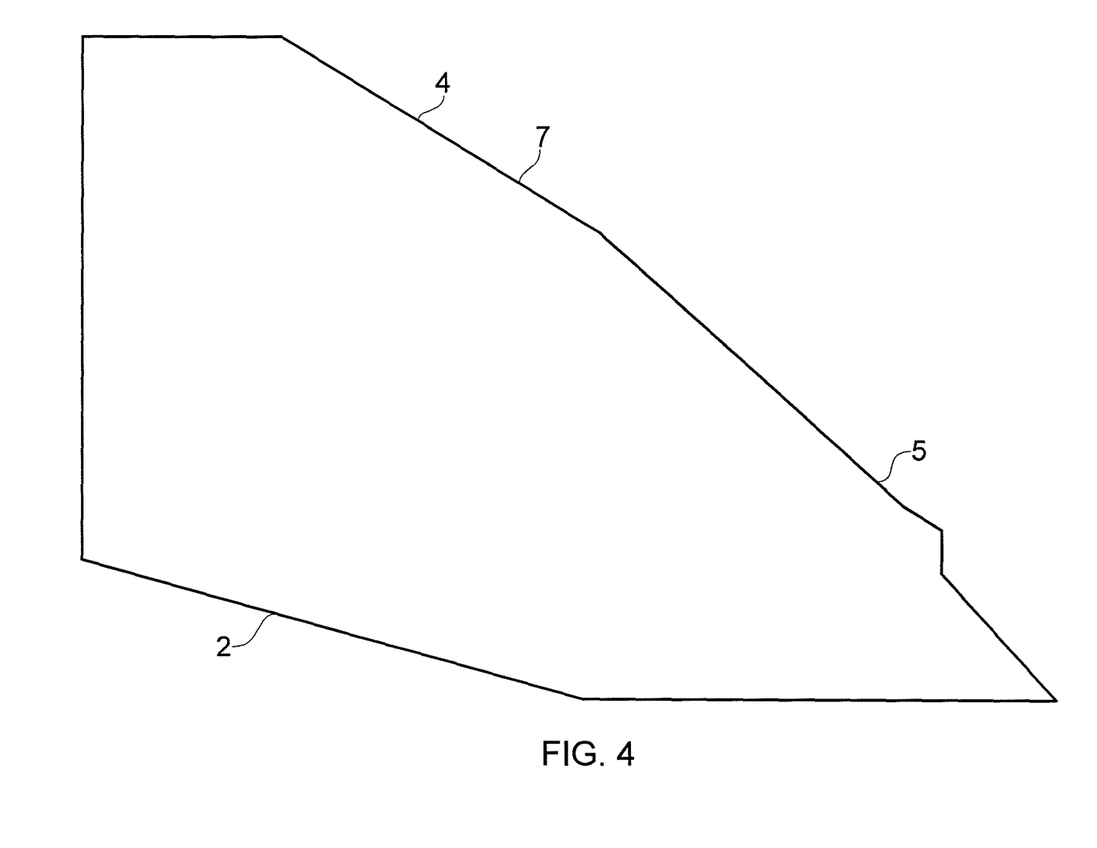
FIG. 4 is a further detailed view with the hungry board cutaway and showing an additional rigid fastening arrangement.

FIG. 4 is a further detail view in which a series of rigid fastening systems 8 are provided for fastening a portion of the hungry board 4 to the upper lip of the edge of body 2, as will subsequently be described in more detail with reference to FIG. 7. The fastening systems include box shaped lugs that receive bolts or pins to hold them within complementary recesses formed within the hungry board 4.

Figure 5:
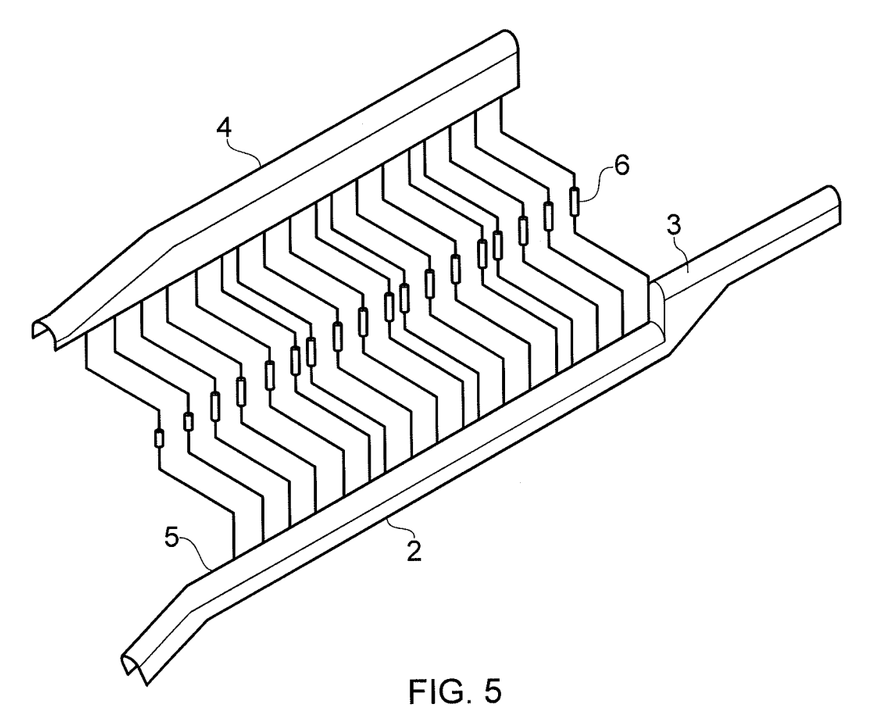
FIG. 5 is an exploded view of the hungry board and plurality of resilient fasteners.

FIG. 5 is an exploded view showing the plurality of resilient members 6 interposed between the upper lip of the edge of body 2 and the hungry board 4.

Figure 6:
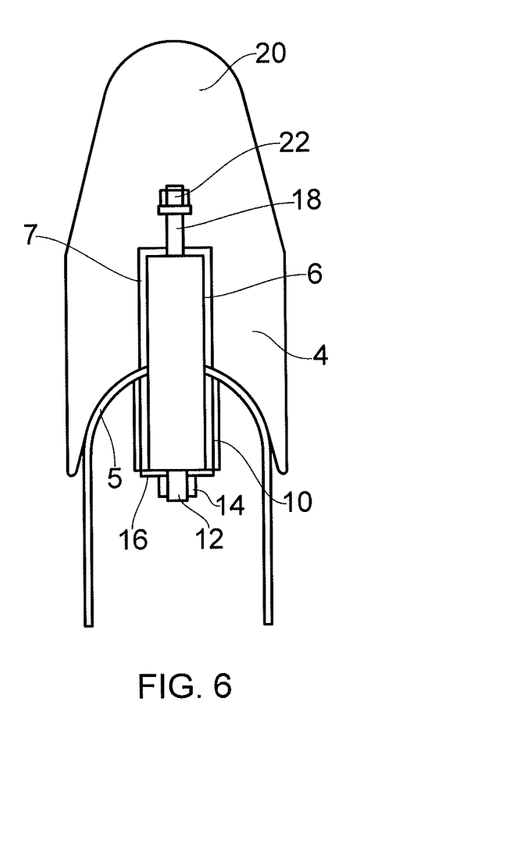
FIG. 6 is a cross sectional detailed view of a resilient fastener.

FIG. 6 is a detailed cross sectional view showing the fastening of a resilient member 6 between the hungry board 4 and the upper lip 5 of the edge of body 2. It will be seen that the lower portion of the resilient member is received within tube 10. The upper edge of tube 10 abuts about the rim of a hole formed through the upper lip 5 of the edge of body 2. A bolt 12 extends from the lower portion of the resilient member 6 and is captured by a nut 14 and washer 16. The washer 16 is oversized relative to tube 10 so that bolt 12 and hence the resilient member 6 are captured relative to the upper lip of the edge of the body.

At its upper extent the resilient member 6 terminates in an upper bolt 18 which protrudes into a bore 20. A nut and washer 22 capture the upper bolt 18 thereby securing the hungry board 4 to the upper lip 5 of the edge of the body 2.

Figure 7:
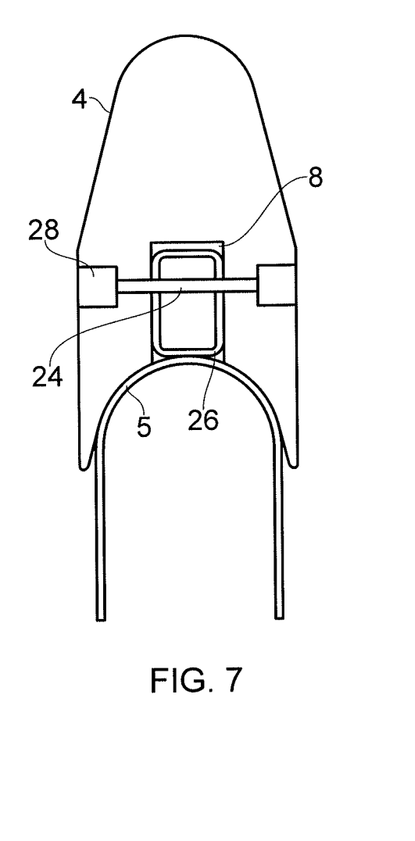
FIG. 7 is a cross sectional detailed view of a rigid fastener.

FIG. 7 is a detailed cross sectional view showing the fastening of a hungry board 4 to the upper lip of the edge of the body 2 by means of the rigid, fastening system 8 including a box shaped lug 26, bolt 24 and washers and nuts 28. The box shaped lug 26 is welded to the top of the upper lip 5 of the edge of the body 2.

It will be seen in FIGS. 6 and 7 that the underside of the hungry board 8 is shaped to complement the topside of lip 5 of the body. It will be realized that the underside of the hungry board 8 may be appropriately shaped to complement other lip shapes and sizes as required.

Preferably the height of the hungry board 4 is selected to be appropriate for the type of load for which the body is to be used.

Figure 8:
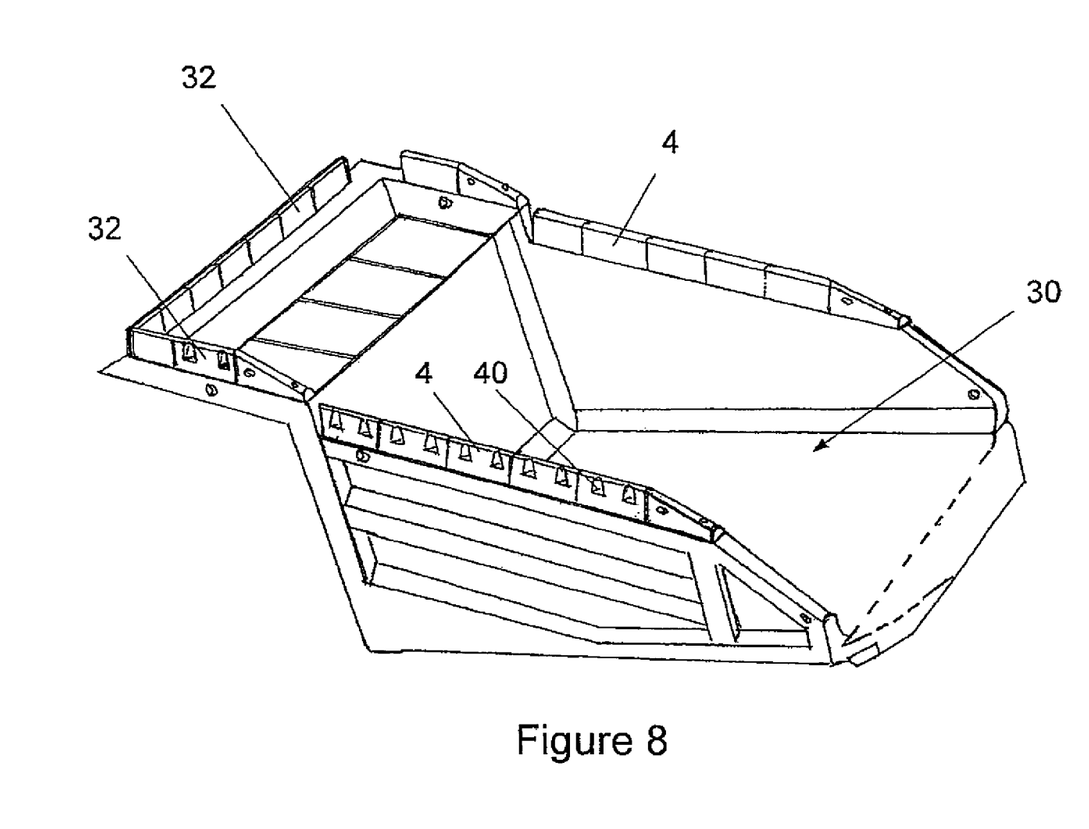
FIG. 8 is a top and side view of a tip truck body equipped with hungry boards according to a preferred embodiment of the present invention.

Referring now to FIG. 8, there is depicted a tip truck bucket, or body, 30 that has been fitted with hungry boards 4 according to a preferred resilient fastening system as will be explained shortly with reference to FIG. 9. The forward end of the body 30 has also been fitted with head boards 32 which are of the same form as the hungry boards 4 but fitted with a rigid fastening assembly, for example a fastening assembly corresponding to that described with reference to FIG. 7.

The hungry boards 4 depicted in FIG. 8 are of a non-ferrous composite material and typically 1 meter long by 450 mm high by 220 mm thick with a weight of about 18 kg. However, boards of a plurality of other lengths may be made so as to facilitate fitting of the boards about the body 30.

Figure 9:
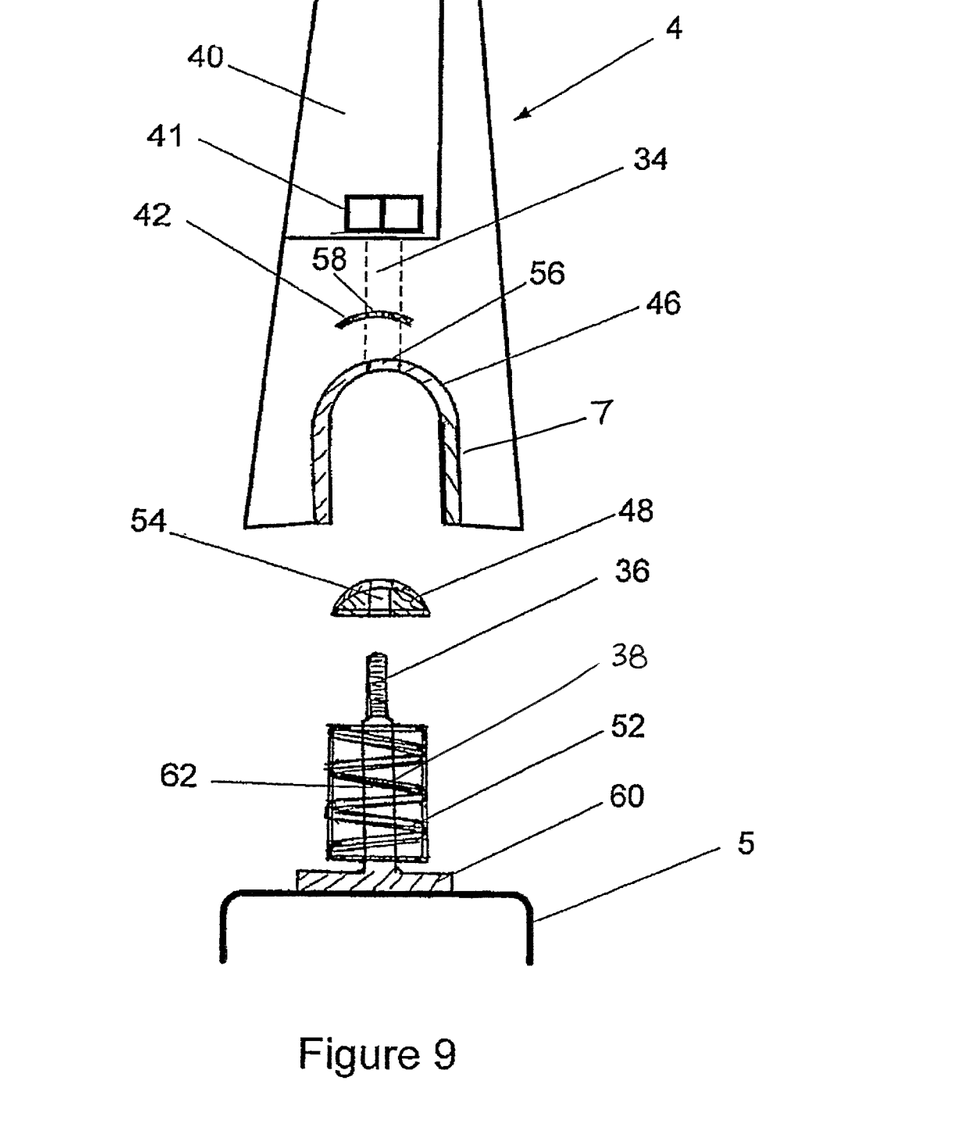
FIG. 9 is an exploded view of a resilient fastening arrangement according to a preferred embodiment of the present invention.
Figure 10:
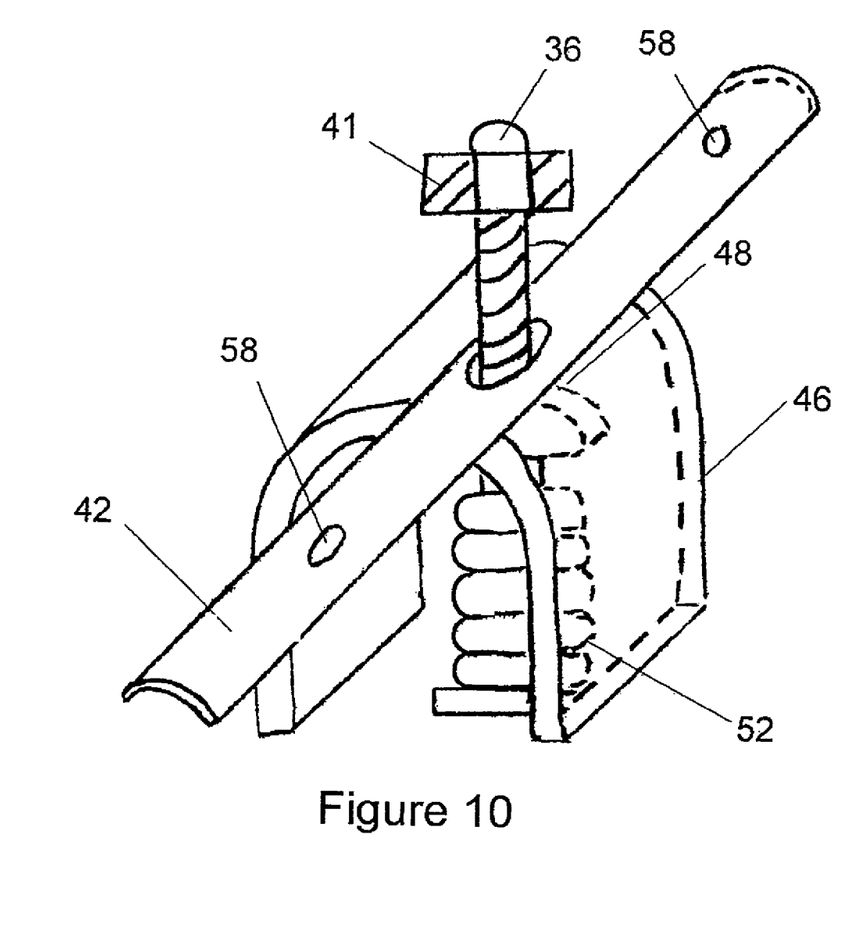
FIG. 10 is an assembly view of the resilient fastening arrangement of FIG. 9.

With reference to FIGS. 9 and 10, each of the hungry boards 4, and head boards 32, is formed with a pair of spaced apart vertical bores 34 corresponding to and depending downward from, the access cut-outs 40 that are shown in FIG. 8. Referring again to FIG. 9, vertical bore 34 receives the threaded end 36 of an anchor bolt 38. As shown in FIG. 9, which is an exploded view of a resilient fastening system for attachment of the hungry board 4, the anchor bolt 38 is formed with a flat foot 60 from which a shank 62 of square cross section extends. The shank 62 terminates upwardly in a threaded upper end 36. A compression spring 52 is located about the shank 62.

The foot 60 of the anchor bolt 38 is welded or otherwise fastened to the topside of lip 5 of the body 30. The hungry boards 4 and head boards 32 are formed with access cut-outs 40 to facilitate access of a tightening tool, such as a socket wrench to tighten lock nut 30 onto threaded end 36 of anchor bolt 38.

The threaded end 36 penetrates a bore 54 formed through rotating plate 48, a slot 56 formed through body anchor bracket 46 and a hole 58 formed through internal support plate 42.

Body anchor bracket 46 is an inverted "U" shape piece of metal that is formed into a u-shaped aperture or receptacle 7 in the underside of the hungry board 4. The rotation plate 48 is formed with an outwardly convex upper surface that complements the interior apex of the anchor bracket 46 so that the two abut.

The internal support plate 42 is also formed into the hungry board 4 and is of sufficient length to span between adjacent anchor bolts 38 and to be fastened over them by means of its holes 58.

In use, upon an impact force being directed to the side of the hungry board 4, the hungry board transmits the force to body anchor bracket 46 which in turn transmits the force through rotating plate 48, which it abuts, and so onto compression spring 52. The compression spring acts to absorb and dissipate the force so that the likelihood of damage to the hungry board 4 occurring is greatly reduced.

The internal support plate 42 assists since it helps to distribute the impact force between the adjacent compression springs that it is coupled to. It will also be noted that the slot 56 through body anchor bracket 46 allows for the anchor bracket, and so hungry board 4, to move relative to the threaded end 36 of anchor bolt 38 to transmit lateral forces to the compression spring 52.

Furthermore, the rotation plate 48 upon which anchor bracket 46 sits is also able to move, and in particular to rotate, relative to the threaded end 36. Consequently impact forces causing both rotation and lateral movement of the hungry board are transmitted to and absorbed by the compression spring 52.

Figure 11:
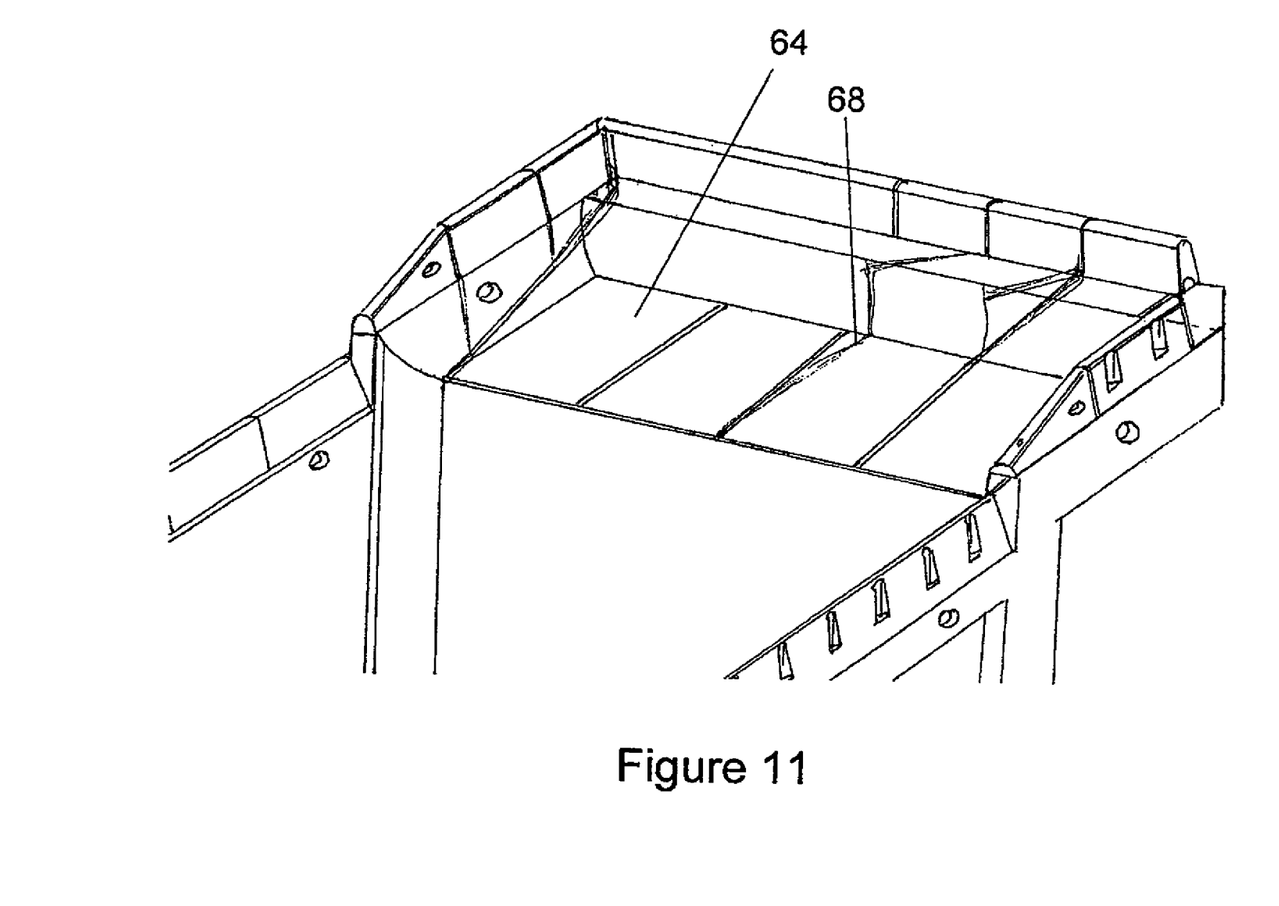
FIG. 11 is view of the top side of a head board section of a tip truck body according to an embodiment of the present invention.
Figure 12:
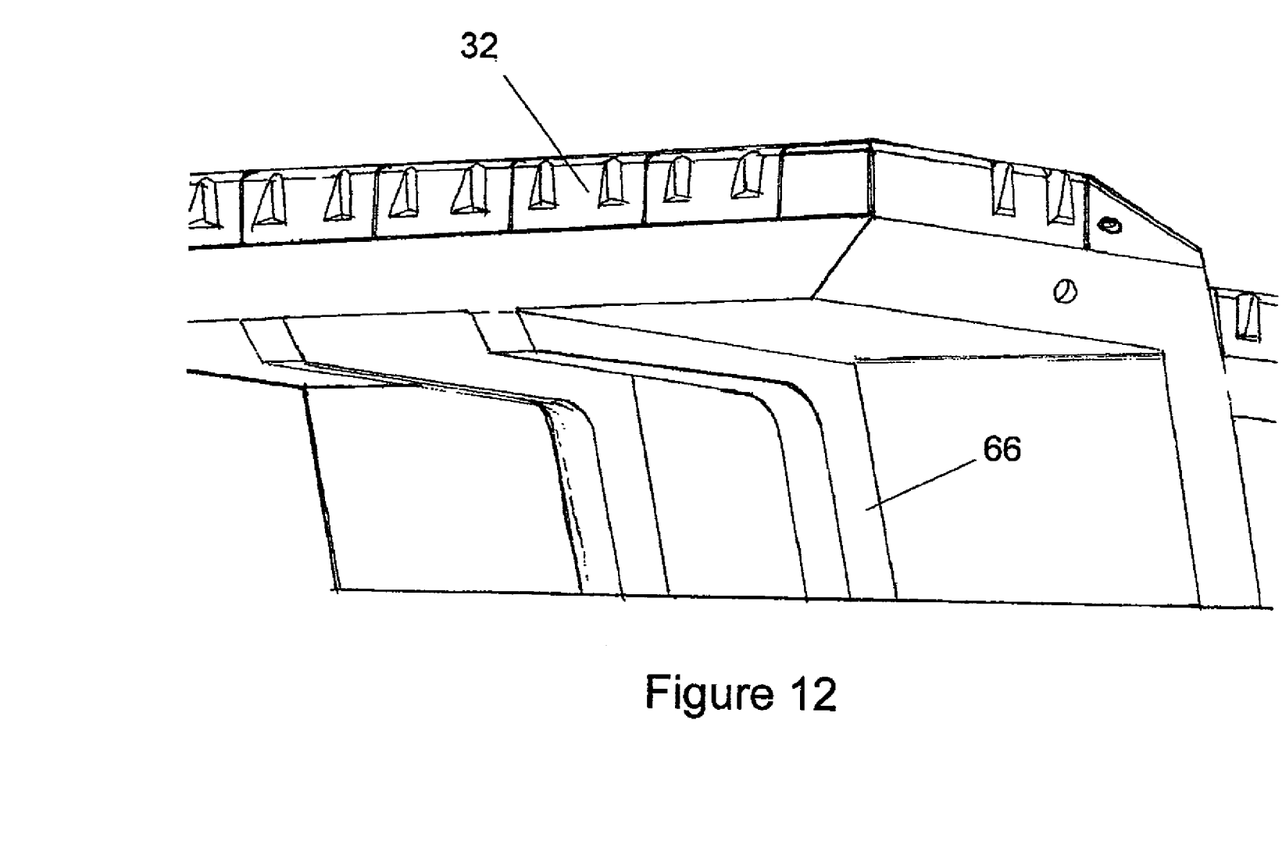
FIG. 12 is a view of the front of the tip truck body of FIG. 11.

Referring now to FIG. 11, composite head board panels 64 may be used in place of the steel panels that are regularly employed. By using composite panels the weight of body is reduced so that the size, and weight, of the reinforcement gusseting, shown as item 66 in FIG. 12, can also be reduce thereby leading to a reduction in weight and fuel consumption for the vehicle. Furthermore, as indicated by item 68 of FIG. 11, composite head board panels of modified shape can be readily manufactured to accommodate the underlying vehicle cabin envelope.

Figures 13, 14, 15:
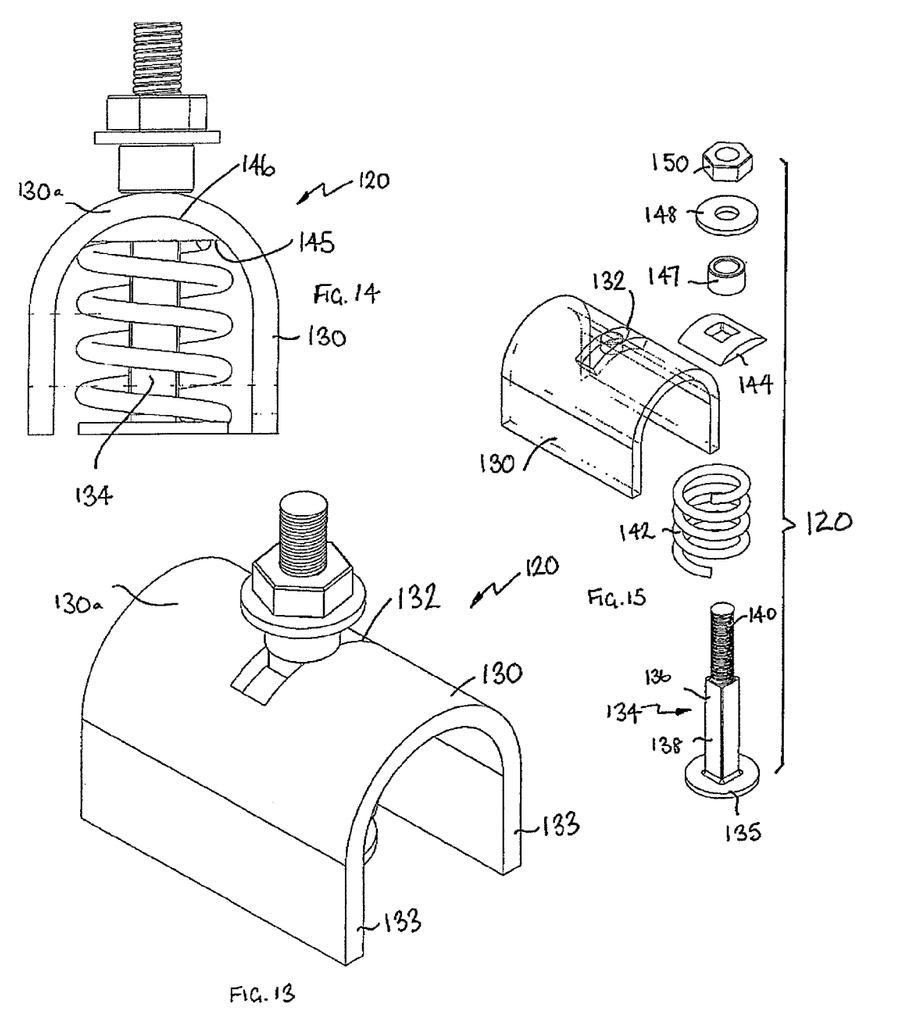
FIG. 13 is an isometric view of a second embodiment of a mount for a side wall extension.
FIG. 14 is an end view of the mount of FIG. 13.
FIG. 15 is an exploded view showing the components of the mount of FIG. 13.
Figure 16:
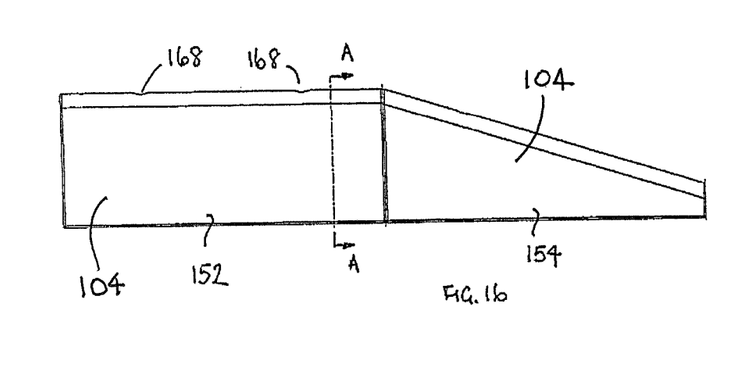
FIG. 16 is a side view of a further side wall extension.
Figure 17:
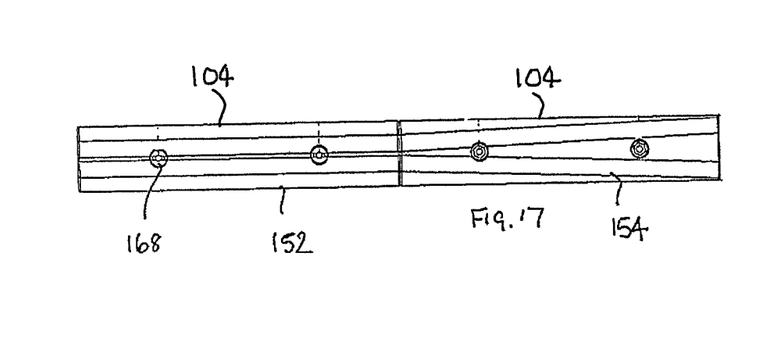
FIG. 17 is a top plan view of the side wall extension of FIG. 16.
Figure 18:
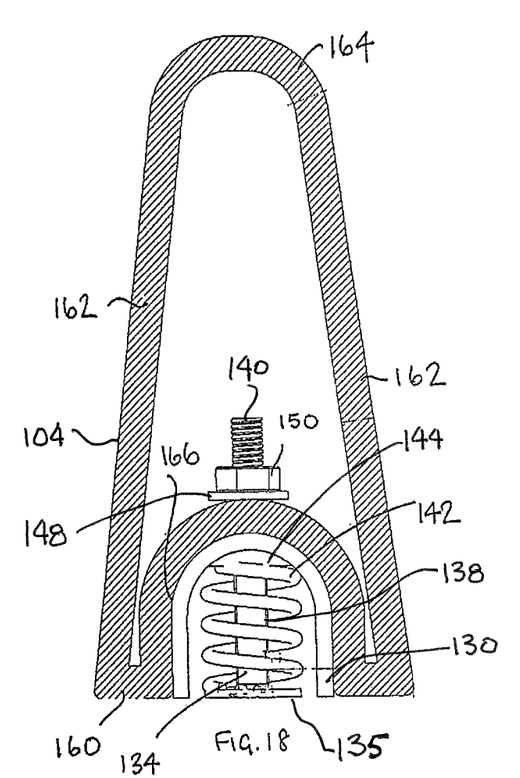
FIG. 18 is an enlarged cross-section through of the side wall extension of FIG. 16 on A-A.

FIGS. 13 to 18 illustrate variants of the hungry boards described above. In particular, FIGS. 16 to 18 show hungry boards/side wall extensions 104 formed from a non-ferrous material in more detail and FIGS. 13 to 15 show a variant of a fastening system 120 for attaching the hungry boards 104 to the side walls/canopy of the truck.

As is best seen in FIGS. 13 to 15, the fastening system includes an inverted U shaped channel 130 in the top 130a of which is an elongate slot 132 which runs perpendicular to the longitudinal axis of the channel. The base of the legs 133 of the channel defines its base.

With reference to the exploded view, FIG. 15 shows the fastening system 120 includes an anchor member in the form of a bolt 134 which has a round head 135 and a shaft 136 which defines a square cross-section 138 proximal to the head and a distal threaded cylindrical portion 140. A resilient member in the form of a compression spring 142 locates over the shaft and is compressed between the head 135 of the bolt and a rotation plate 144 in the form of a plate having a flat face 145 and an opposed curved face 146 having the same curvature as the top 130a of the channel 130.

The spring tends to force the rotation plate 144 to the top of the channel, keeping the bolt substantially perpendicular the base of the channel.

A cylindrical spacer 147 having an annular cross-section, a washer 148 and a nut 150 locate on the threaded end of the bolt. These are used to attach a hungry board (104) component to a dump body. In use, the base of the legs 133 of the channels are welded to the top of the side walls of the dump body 110 and to the side of its canopy, and the bolt, spring and spacer plate 144 disposed inside the channel as shown in FIG. 14. A plurality of mounts are attached along the top of the side walls at predetermined spacings.

FIGS. 16 to 17 illustrate a hungry board in more detail as well as the method of attaching the hungry board to the body.

With reference to FIG. 16 it can be seen that the hungry boards 104 comprise two different components 152, and 154 a plurality of which are placed end to end to form a side wall extension of the required length.

The component 152 has a gently tapering cross-section with a flat base 160, side walls 162 which taper towards one another from bottom to top, and a rounded top 164. As is best seen in FIG. 18 the side wall extension component 154 includes a receptacle in the form of an inverted U-shaped recess or channel 166 in its base which extends longitudinally along the base. As can also be seen the hungry board component 152 is generally hollow, its shape and structure being defined by external walls. The hungry board is preferably formed from a suitable plastics material typically polyethylene.

As is best seen in FIGS. 16 and 17, the hungry board defines a series of holes 168 in the top for use in attaching the hungry board to a mount using the bolt 134, nut 150 and washer 148.

The second hungry board 154 is used to form one end of the side wall extension and is similar to the hungry board 152 except that it also tapers longitudinally from a height at one end which matches the height of the hungry board 152 to a height at its opposite end which is approximately twice the height of the mount 130.

As discussed above, in use, the base of the legs of the channel are welded to the top of the side wall of the dump body and to the side of its canopy, and the bolt, spring and spacer plate 144 disposed inside the channel as shown in FIG. 14. A plurality of mounts are attached along the top of the side walls at predetermined spacings. The predetermined spacings equate to the 500 mm distance between the holes 86 in the hungry boards.

The hungry boards are then mounted on the bolts as shown in FIG. 18.

If the hungry boards are impacted or struck, the hungry board can deflect to one side to absorb the impact with the spring biasing the bolt and side wall hungry board back to an upright position. The flexible polyethylene material should also be able to deflect and regain its original shape.

The hungry boards may be simply removed when not required, or for replacement or repair. It will also be appreciated that the size/height of the side wall extensions and therefore the volumetric carrying capacity of the dump body may be varied.

It will be understood that a hungry board system according to a preferred embodiment of the present invention provides a number of advantages.

Less expensive to build
Are extremely light
Allows for more payload
More payload more revenue
Are extremely strong
They have give and flex in them when rocks/material/excavator bucket makes contact with them
They are impact resistant
They are mounted in individual pieces to the body
They have independent mounting bolts, elastomeric or spring mounting systems for flex and ease of replacement
Can be easily removed and replaced by one to two men due to weight
No cranes required to fit to body
Minimal time for personnel working at height to fit system complete or by sections
No scaffolding required
Minimal use of a EWP
No hot permits required
Less maintenance costs for personnel more profit for operation
Less ongoing maintenance cost and truck down time to a mining site, more profit
No welding, cutting or grinding
No noise to the maintenance personnel when fitting
No painting or sand blasting required,
The systems may be color coded to suit an specific model truck
They can be replaced in the field in a matter of minutes not days as with steel
Sites can have replacement pieces in store
No welding machine hire or consumable costs
Systems are supplied in kit form or individual sections In compliance with the statute, the invention has been described in language more' or less specific to structural or methodical features.

The term "comprises" and its variations, such as "comprising" and "comprised of is used throughout in an inclusive sense and not to the exclusion of any additional features.

It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A hungry board assembly including:
a hungry board (4; 104, 152, 154) formed of a non-ferrous material;
one or more resilient members (152; 142); and
a fastening system (8, 120) for attaching the hungry board to a body of a transportation vehicle by means of said resilient members, the fastening system including one or more anchor members for fastening to the body of the vehicle, each anchor member including an elongate shaft and the resilient members comprise springs located about corresponding ones of the elongate shafts, the springs acting to absorb and dissipate forces directed to the side of the hungry board, thus reducing the likelihood of damage to the hungry board.

2. An assembly according to claim 1, wherein the fastening system includes one or more anchor brackets (46; 166) formed into an underside of the hungry board for fastening to corresponding ones of the anchor members.

3. An assembly according to claim 2, including rotation plates (48; 144) located beneath the anchor brackets.

4. An assembly according to claim 3, wherein the springs are captured between a feet of the anchor members and the rotation plate (48; 144).

5. An assembly according to claim 4, wherein ends of the anchor members opposite the feet penetrate the rotation plate and the body anchor bracket and are retained thereon by respective fastening members (41; 150).

6. An assembly according to claim 5, wherein the hungry boards are formed with cutaways (40; 168) to allow access for a tool to the fastening members.

7. An assembly according to claim 1, wherein the hungry board (4; 104) is formed of an elastomeric material.

8. An assembly according to claim 1, wherein the resilient members (6) may comprise a piece of elastomeric material and/or composite material such as a synthetic rubber.

9. An assembly according to claim 8, wherein the fastening system includes nuts, bolts and washers for retaining one end of the resilient member to the body and another end to the hungry board.

10. An assembly according to claim 9, wherein the hungry board is formed with a series of receptacles (7; 166) to receive corresponding ones of the one or more resilient members.

11. An ore transportation vehicle having a body (2) fitted with a hungry board assembly according to claim 1.

* * * * *